(12) United States Patent
Hashimoto et al.

(10) Patent No.: US 12,005,904 B2
(45) Date of Patent: *Jun. 11, 2024

(54) AUTONOMOUS DRIVING SYSTEM

(71) Applicant: TOYOTA JIDOSHA KABUSHIKI KAISHA, Toyota Aichi-ken (JP)

(72) Inventors: Ryuta Hashimoto, Susono Shizuoka-ken (JP); Yoshinori Watanabe, Gotenba Shizuoka-ken (JP); Kenichiro Aoki, Miyoshi Aichi-ken (JP); Tomoyuki Kuriyama, Hadano Kanagawa-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,118

(22) Filed: Dec. 15, 2022

(65) Prior Publication Data

US 2023/0115658 A1 Apr. 13, 2023

Related U.S. Application Data

(63) Continuation of application No. 17/558,948, filed on Dec. 22, 2021, now Pat. No. 11,703,876, which is a
(Continued)

(30) Foreign Application Priority Data

Aug. 10, 2016 (JP) .................................. 2016-157705

(51) Int. Cl.
*B60W 30/18* (2012.01)
*B60W 10/18* (2012.01)
(Continued)

(52) U.S. Cl.
CPC ...... *B60W 30/18163* (2013.01); *B60W 10/18* (2013.01); *B60W 10/20* (2013.01);
(Continued)

(58) Field of Classification Search
CPC .. G05D 1/0223; G05D 1/0248; G05D 1/0276; G05D 2201/0213; B60W 10/18;
(Continued)

(56) References Cited

U.S. PATENT DOCUMENTS 6,961,661 B2 * 11/2005 Sekiguchi ............. B60W 30/16
701/96
9,672,734 B1 6/2017 Ratnasingam
(Continued)

FOREIGN PATENT DOCUMENTS

| DE | 102011016770 A1 | 11/2011 |
| DE | 102012025328 A1 | 7/2013 |

(Continued)

OTHER PUBLICATIONS

Non-Final Office Action dated Jul. 21, 2021 in U.S. Appl. No. 16/848,156.
(Continued)

*Primary Examiner* — Gertrude Arthur Jeanglaude
(74) *Attorney, Agent, or Firm* — Dinsmore & Shohl LLP

(57) ABSTRACT

An autonomous driving system acquires information concerning a vehicle density in an adjacent lane that is adjacent to a lane on which an own vehicle is traveling, when the own vehicle travels on a road having a plurality of lanes. The autonomous driving system selects the adjacent lane as an own vehicle travel lane, when the vehicle density in the adjacent lane that is calculated from the acquired information is lower than a threshold density that is determined in accordance with relations between the own vehicle and surrounding vehicles. The autonomous driving system per-
(Continued)

forms lane change to the adjacent lane autonomously, or propose lane change to the adjacent lane to a driver, when the adjacent lane is selected as the own vehicle travel lane.

17 Claims, 8 Drawing Sheets

Related U.S. Application Data continuation of application No. 16/848,156, filed on Apr. 14, 2020, now Pat. No. 11,275,382, which is a continuation of application No. 15/669,049, filed on Aug. 4, 2017, now Pat. No. 10,663,973.

(51) Int. Cl.
*B60W 10/20* (2006.01)
*B60W 30/14* (2006.01)
*B60W 40/04* (2006.01)
*B60W 50/14* (2020.01)
B60W 50/00 (2006.01)
G05D 1/00 (2006.01)

(52) U.S. Cl.
CPC .......... *B60W 30/143* (2013.01); *B60W 40/04* (2013.01); *B60W 50/14* (2013.01); *B60W 2050/0075* (2013.01); *B60W 2420/403* (2013.01); *B60W 2420/408* (2024.01); *B60W 2520/10* (2013.01); *B60W 2520/14* (2013.01); *B60W 2552/05* (2020.02); *B60W 2552/50* (2020.02); *B60W 2554/00* (2020.02); *B60W 2554/20* (2020.02); *B60W 2554/4026* (2020.02); *B60W 2554/4029* (2020.02); *B60W 2554/4041* (2020.02); *B60W 2554/406* (2020.02); *B60W 2554/801* (2020.02); *B60W 2554/802* (2020.02); *B60W 2554/804* (2020.02); *B60W 2556/45* (2020.02); *B60W 2720/10* (2013.01); *B60W 2720/14* (2013.01); *B60W 2754/10* (2020.02); *B60W 2754/30* (2020.02); *B60W 2754/50* (2020.02); *G05D 1/0248* (2013.01); *G05D 1/0276* (2013.01)

(58) Field of Classification Search
CPC ............... B60W 10/20; B60W 30/143; B60W 30/18163; B60W 40/04; B60W 50/14; B60W 2554/4041; B60W 2754/50; B60W 2554/00; B60W 2754/10; B60W 2556/45; B60W 2754/30; B60W 2552/05; B60W 2554/801; B60W 2420/42; B60W 2420/52; B60W 2520/10; B60W 2520/14; B60W 2720/10; B60W 2720/14

See application file for complete search history.

(56) References Cited

U.S. PATENT DOCUMENTS

| | | |
|---|---|---|
| 11,275,382 B2 | 3/2022 | Hashimoto et al. |
| 2009/0012703 A1 | 1/2009 | Aso et al. |
| 2012/0271518 A1 | 10/2012 | Van Den Broek et al. |
| 2015/0166062 A1 | 6/2015 | Johnson et al. |
| 2015/0194055 A1 | 7/2015 | Maass |
| 2016/0091897 A1 | 3/2016 | Nilsson et al. |
| 2018/0043935 A1 | 2/2018 | Hashimoto et al. |
| 2022/0113735 A1* | 4/2022 | Hashimoto ......... B60W 30/143 |

FOREIGN PATENT DOCUMENTS

| | | |
|---|---|---|
| DE | 102012214979 A1 | 2/2014 |
| DE | 102014000843 A1 | 8/2014 |
| JP | 2002334393 A | 11/2002 |
| JP | 2006277546 A | 10/2006 |
| JP | 2009018623 A | 1/2009 |
| WO | 2007102405 A1 | 9/2007 |

OTHER PUBLICATIONS

Notice of Allowance dated Nov. 10, 2021 in U.S. Appl. No. 16/848,156.
Non-Final Office Action dated Feb. 11, 2019 in U.S. Appl. No. 15/665,863.
Notice of Allowance dated Jun. 20, 2019 in U.S. Appl. No. 15/665,863.
Non-Final Office Action dated May 29, 2019 in U.S. Appl. No. 15/669,049.
Final Office Action dated Sep. 11, 2019 in U.S. Appl. No. 15/669,049.
Notice of Allowance dated Jan. 16, 2020 in U.S. Appl. No. 15/669,049.
Non-Final Office Action dated Feb. 22, 2023 of U.S. Appl. No. 17/558,948.
Notice of Allowance dated Mar. 30, 2023 in U.S. Appl. No. 17/558,948.

* cited by examiner

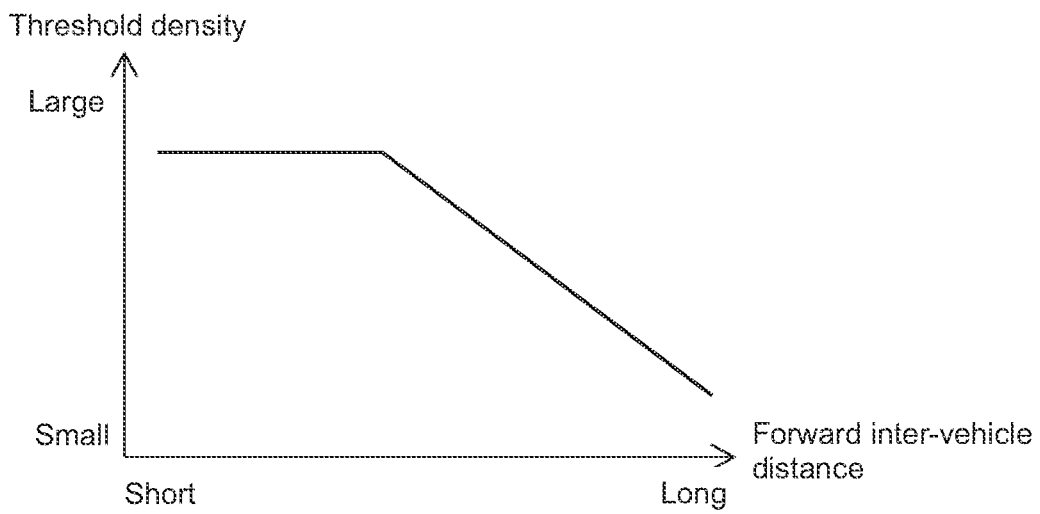

Fig.7

| Standard traveling speed[km/h] | Traveling speed of preceding vehicle of own lane [km/h] | Vehicle density of own lane |
|---|---|---|
| 60 | 20 | (Representative value of standard vehicle density)*1.7 |
| | 40 | (Representative value of standard vehicle density)*1.3 |
| | 60 or more | (Representative value of standard vehicle density)*1 |
| 100 | 60 | (Representative value of standard vehicle density)*1.5 |
| | 80 | (Representative value of standard vehicle density)*1.2 |
| | 100 or more | (Representative value of standard vehicle density)*1 |

Fig.8

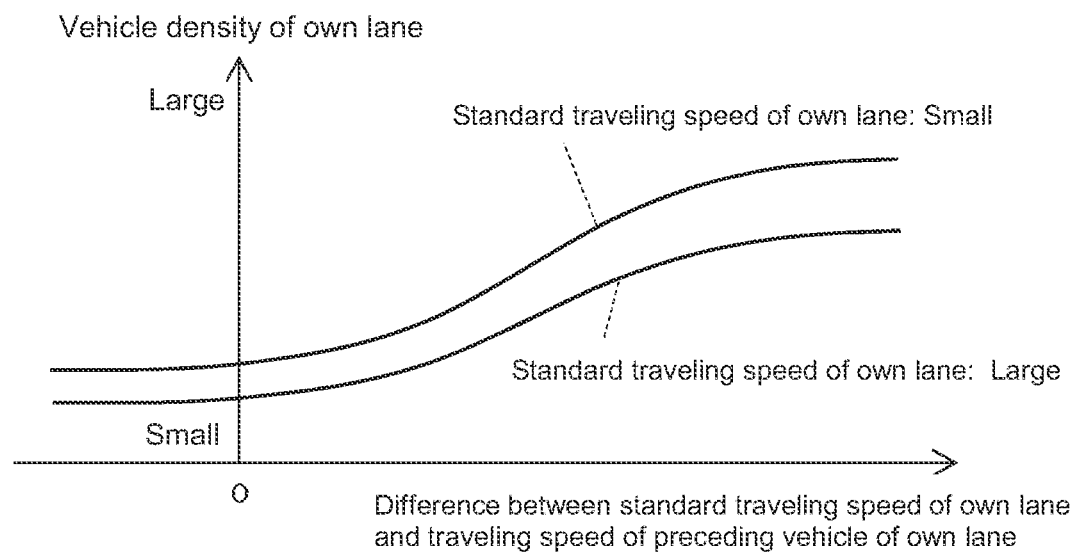

Fig.9

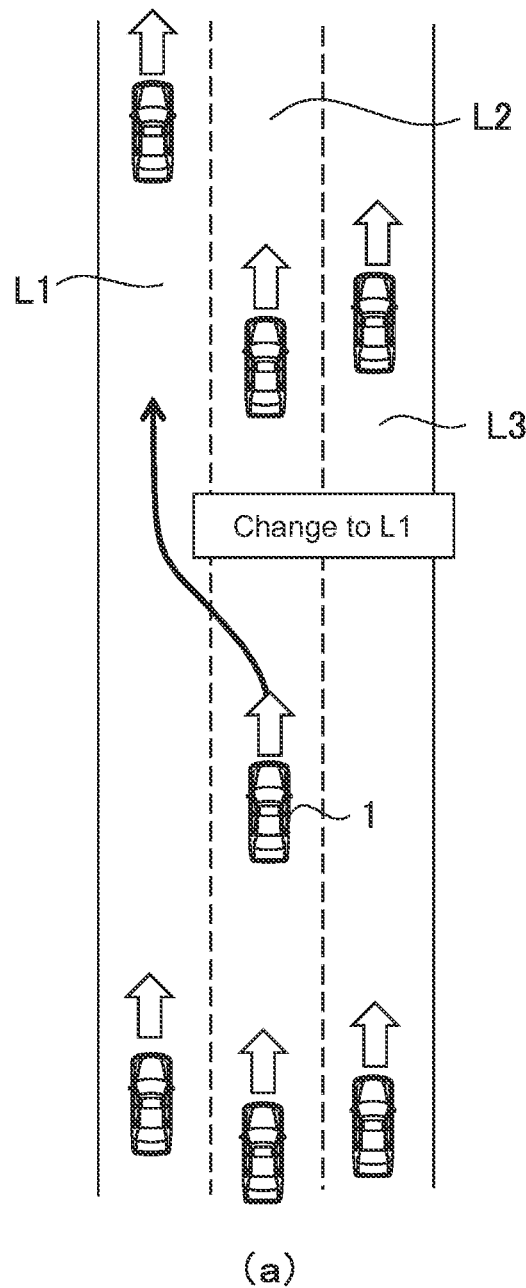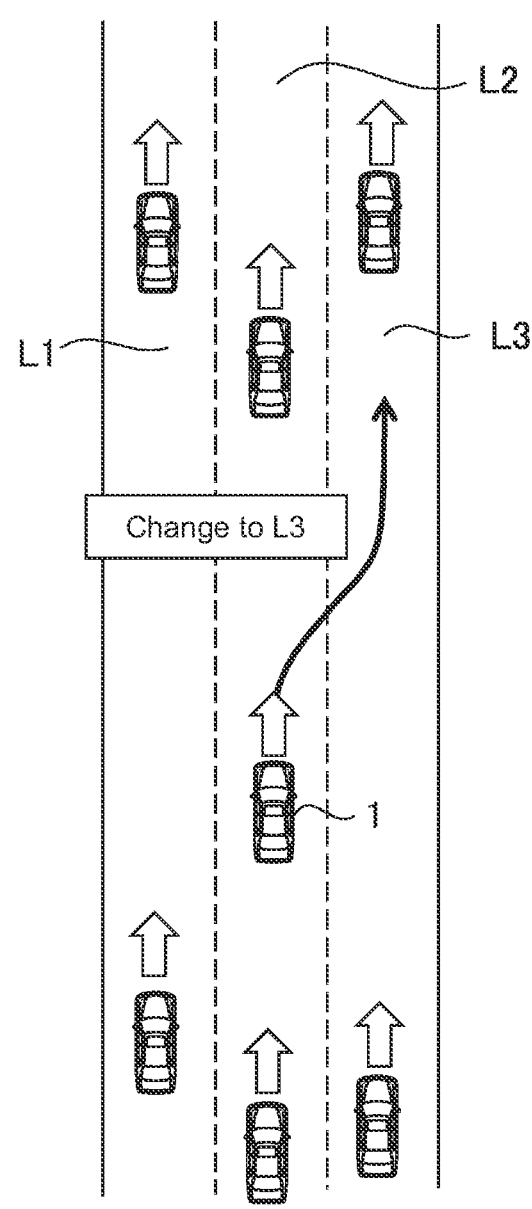
Fig.11

AUTONOMOUS DRIVING SYSTEM

CROSS-REFERENCE TO RELATED APPLICATION

This application is a continuation application of U.S. patent application Ser. No. 17/558,948, filed Dec. 22, 2021, which is a continuation application of U.S. patent application Ser. No. 16/848,156, filed Apr. 14, 2020, which is a continuation application of U.S. patent application Ser. No. 15/669,049 filed Aug. 4, 2017, which claims the benefit of Japanese Patent Application No. 2016-157705, filed on Aug. 10, 2016, the entire contents of each application is hereby incorporated by reference herein.

BACKGROUND

Field

The present disclosure relates to an autonomous driving system mounted on a vehicle.

Background Art

DE 102012025328A1 discloses a device that determines whether or not to execute lane change based on vehicle speeds of and inter-vehicle distances of vehicles traveling in an adjacent lane when determining that a driver has an intention to perform lane change.

SUMMARY

For realizing smooth traffic, it is demanded not to generate an imbalance in a traffic flow in each of lanes.

However, according to the prior art described in DE 102012025328A1, lane change is performed regardless of an imbalance in a traffic flow when lane change is demanded. Therefore, an imbalance in a traffic flow cannot be eliminated by using this prior art.

The present disclosure is made in the light of the problem as described above, and has an object to provide an autonomous driving system that can contribute to eliminate an imbalance in a traffic flow in each of lanes of a road on which an own vehicle is traveling.

An autonomous driving system according to the present disclosure includes at least an information acquisition section, a lane selection section and a control section. The information acquisition section is configured to acquire information concerning a vehicle density in an adjacent lane that is adjacent to a lane on which an own vehicle is traveling, when the own vehicle travels on a road having a plurality of lanes. The lane selection section is configured to select the adjacent lane as an own vehicle travel lane, when the vehicle density in the adjacent lane that is calculated from the information acquired by the information acquisition section is lower than a threshold density that is determined in accordance with relations between the own vehicle and surrounding vehicles. The control section is configured to perform lane change to the adjacent lane autonomously, or propose lane change to the adjacent lane to a driver, when the lane selection section selects the adjacent lane as the own vehicle travel lane.

According to the above described configuration, when the vehicle density in the adjacent lane is lower than the threshold density, lane change to the adjacent lane is performed autonomously, or lane change to the adjacent lane is proposed to a driver. Therefore, a traffic flow is dispersed by the lane change of the own vehicle at least between the lane on which the own vehicle is traveling and the adjacent lane. Consequently, according to the autonomous driving system according to the present disclosure, contribution can be made to elimination of an imbalance in a traffic flow in each of lanes.

The lane selection section may be configured to determine the threshold density in accordance with at least a relative speed to the own vehicle of a vehicle traveling in the adjacent lane. According to this configuration, whether to perform lane change to the adjacent lane is determined with a flow state in the adjacent lane also taken into consideration, in addition to the vehicle density in the adjacent lane. Consequently, an effect of lane change of the own vehicle dispersing a traffic flow can be enhanced, and lane change to suit to a sense of an occupant can be realized. In this case, the threshold density may be set at a smaller value as the relative speed is low.

The lane selection section may be configured to determine the threshold density in accordance with at least a forward inter-vehicle distance between the own vehicle and a vehicle traveling ahead of the own vehicle in the lane on which the own vehicle is traveling, or a rearward inter-vehicle distance between the own vehicle and a vehicle traveling behind the own vehicle in the lane on which the own vehicle is traveling. According to this configuration, whether to perform lane change to the adjacent lane is determined with a congestion state in the lane on which the own vehicle is traveling also taken into consideration, in addition to the vehicle density in the adjacent lane. Consequently, an effect of lane change of the own vehicle dispersing a traffic flow can be enhanced, and lane change to suit to a sense of an occupant can be realized. In this case, the threshold density may be set at a smaller value as the forward inter-vehicle distance or the rearward inter-vehicle distance is long.

The lane selection section may be configured to determine the threshold density in accordance with at least a vehicle density in a lane on which the own vehicle is traveling. According to this configuration, whether to perform lane change to the adjacent lane is determined with a congestion state in the lane on which the own vehicle is traveling also taken into consideration, in addition to the vehicle density in the adjacent lane. Consequently, an effect of lane change of the own vehicle dispersing a traffic flow can be enhanced, and lane change to suit to a sense of an occupant can be realized. In this case, the threshold density may be set at a smaller value as a vehicle density in the lane on which the own vehicle is traveling is small.

Further, the lane selection section may be configured to select as the own vehicle travel lane a lane having a lower vehicle density, of both adjacent lanes that are adjacent to a lane on which the own vehicle is traveling, when vehicle densities in both the adjacent lanes are lower than the threshold density. According to this configuration, contribution can be made to elimination of an imbalance in a traffic flow in each of lanes in a road having three or more lanes.

The lane selection section may be configured to select as the own vehicle travel lane a lane satisfying a constraint determined by regulation information or traveling road information, of both adjacent lanes that are adjacent to a lane on which the own vehicle is traveling, when vehicle densities in both the adjacent lanes are lower than the threshold density. According to this configuration, while satisfying the constraint determined by the regulation information or the traveling road information, contribution can be made to elimination of an imbalance in a traffic flow in each of lanes in a road having three or more lanes.

The lane selection section may be configured to select as the own vehicle travel lane a lane that can make a traveling state of the own vehicle approach more loosely a target traveling state, of both adjacent lanes that are adjacent to a lane on which an own vehicle is traveling, when vehicle densities in both the adjacent lanes are lower than the threshold density. According to this configuration, while making the traveling state of the own vehicle approach the target traveling state, contribution can be made to elimination of an imbalance in a traffic flow in each of lanes in a road having three or more lanes.

According to the autonomous driving system according to the present disclosure, when the vehicle density in the adjacent lane is lower than the threshold density, lane change to the adjacent lane is performed autonomously, or lane change to the adjacent lane is proposed to a driver. Therefore, a traffic flow is dispersed by the lane change of the own vehicle at least between the lane on which the own vehicle is traveling and the adjacent lane. Consequently, according to the autonomous driving system according to the present disclosure, contribution can be made to elimination of an imbalance in a traffic flow in each of lanes.

BRIEF DESCRIPTION OF DRAWINGS

FIG. 7 is a diagram for explaining a calculation method of a threshold density according to a second embodiment;

FIG. 8 is a diagram for explaining a calculation method of a threshold density according to a third embodiment;

FIG. 9 is a diagram for explaining the calculation method of the threshold density according to the third embodiment;

FIG. 11 is a diagram illustrating a specific example of lane change according to the seventh embodiment;

DETAILED DESCRIPTION

Hereunder, embodiments of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures that are described in the embodiments shown as follows are not always indispensable to the disclosure unless specially explicitly shown otherwise, or unless the disclosure is explicitly specified by the structures theoretically.

First Embodiment 1-1. Configuration of Autonomous Driving Vehicle

Figure 1:
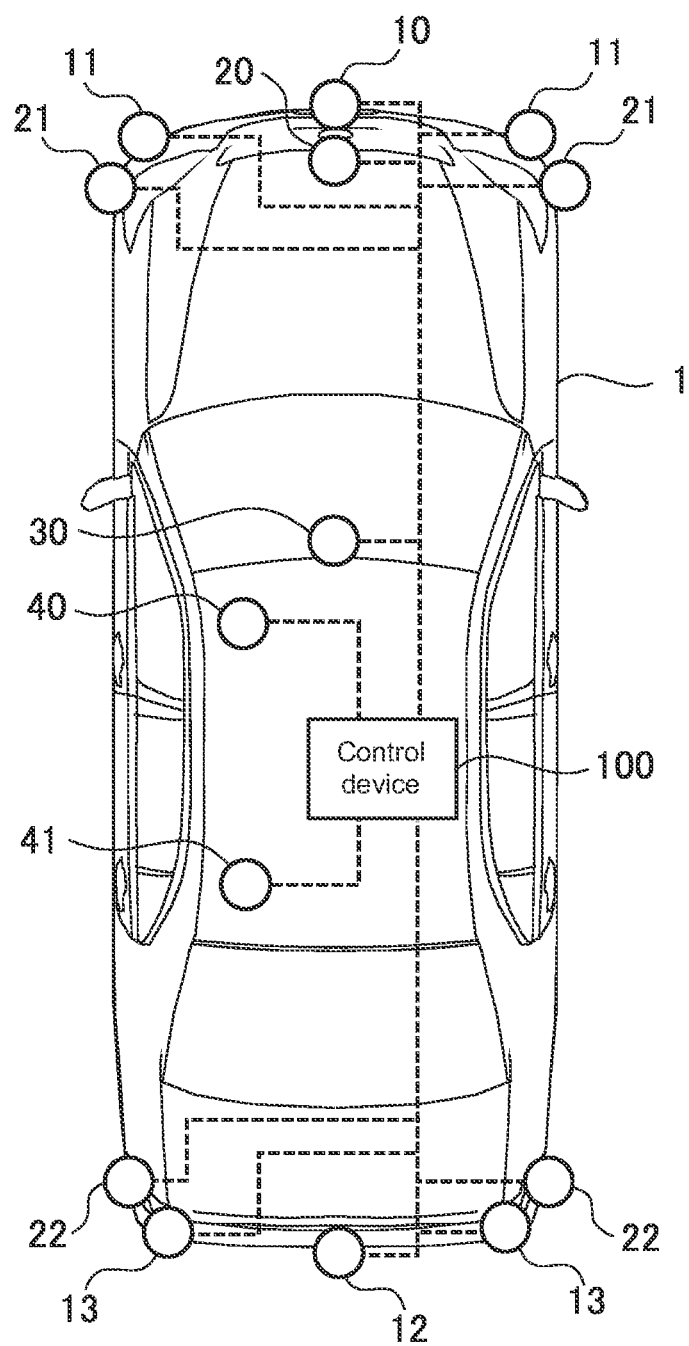
FIG. 1 is a view illustrating an example of an autonomous driving vehicle to which an autonomous driving system according to a first embodiment is applied.

FIG. 1 is a view illustrating an example of an autonomous driving vehicle on which an autonomous driving system according to a first embodiment is mounted. The autonomous driving system performs autonomous driving of a vehicle on which the system is mounted. Note that autonomous driving means that driving operations such as acceleration, deceleration and steering of a vehicle is executed without a driving operation of a driver.

As illustrated in FIG. 1, a vehicle 1 mounted on the autonomous driving system includes an autonomous recognition sensor for directly acquiring information concerning a road on which the vehicle 1 is traveling and information concerning objects that are present in the surroundings of the vehicle 1. The autonomous recognition sensor includes at least one of LIDARs (LIDAR: Laser Imaging Detection and Ranging) 10, 11, 12 and 13, radars 20, 21 and 22 and a camera 30. Further, the vehicle 1 includes a communication device for indirectly acquiring at least a part of these kinds of information from an external system not illustrated. The communication device includes at least one of a road-vehicle communication device 40 and a mobile communication device 41. These autonomous recognition sensor and communication device are connected to a control device 100 that is mounted on the vehicle 1 directly or via a communication network such as a CAN (Controller Area Network) constructed in the vehicle.

The LIDARs include a front LIDAR 10 that detects an object in front of the vehicle 1, front side LIDARs 11 and 11 that detect objects in front sides of the vehicle 1, a rear LIDAR 12 that detects an object in rear of the vehicle 1, and rear side LIDARs 13 and 13 that detect objects in rear sides of the vehicle 1. The LIDARs 10 to 13 output object information concerning detected objects to the control device 100. The object information includes distances and directions of the detected objects from the vehicle 1. Based on the object information obtained by these LIDARs 10, 11, 12 and 13, the control device 100 can grasp a situation of substantially entire surroundings of the vehicle 1. Note that installation positions of the LIDARs and the number of LIDARs that are installed can be determined in accordance with scanning ranges of the LIDARs. Instead of a plurality of LIDARs, only one LIDAR that performs sensing of the entire surroundings of the vehicle 1 may be used.

The radars are millimeter wave radars, for example. The radars include a front radar 20 that detects an object in front of the vehicle 1, front short range radars 21 and 21 that detect objects in a vicinity of the front, and rear short range radars 22 and 22 that detect objects in a vicinity of the rear, for example. The radars 20 to 22 output object information concerning detected objects to the control device 100. The object information includes distances and directions of the detected objects from the vehicle 1.

The camera 30 is provided at a back side of a windshield of the vehicle 1, and picks up an image of a region in front of the vehicle 1, for example. The camera 30 may be a monocular camera, or a stereo camera. The camera 30 outputs picked-up image information to the control device 100. Note that the camera, the LIDARs and the radars do not necessarily have to be included redundantly.

The road-vehicle communication device 40 transmits own vehicle information that is information on the vehicle 1 to infrastructure equipment such as a road side device, and receives road traffic information from the infrastructure equipment. The road traffic information includes information concerning a surrounding situation of the vehicle 1. The road-vehicle communication includes communication with a road traffic information communication system (Vehicle Information and Communication system), for example. The road-vehicle communication device 40 outputs information concerning the surrounding situation of the vehicle 1 which is received to the control device 100.

The mobile communication device 41 transmits the own vehicle information of the vehicle 1 and information acquired by the autonomous recognition sensor to a server on the Internet via a mobile communication system such as 3G, 4G and LTE, and receives information concerning the surrounding situation of the vehicle 1 from the server. The mobile communication device 41 outputs the information concerning the surrounding situation of the vehicle 1 which is received to the control device 100. Note that the mobile communication device 41 and the road-vehicle communication device 40 do not necessarily have to be included redundantly. Further, these communication devices are not always indispensable in the vehicle 1.

1-2. Configuration of Autonomous Driving System

Figure 2:
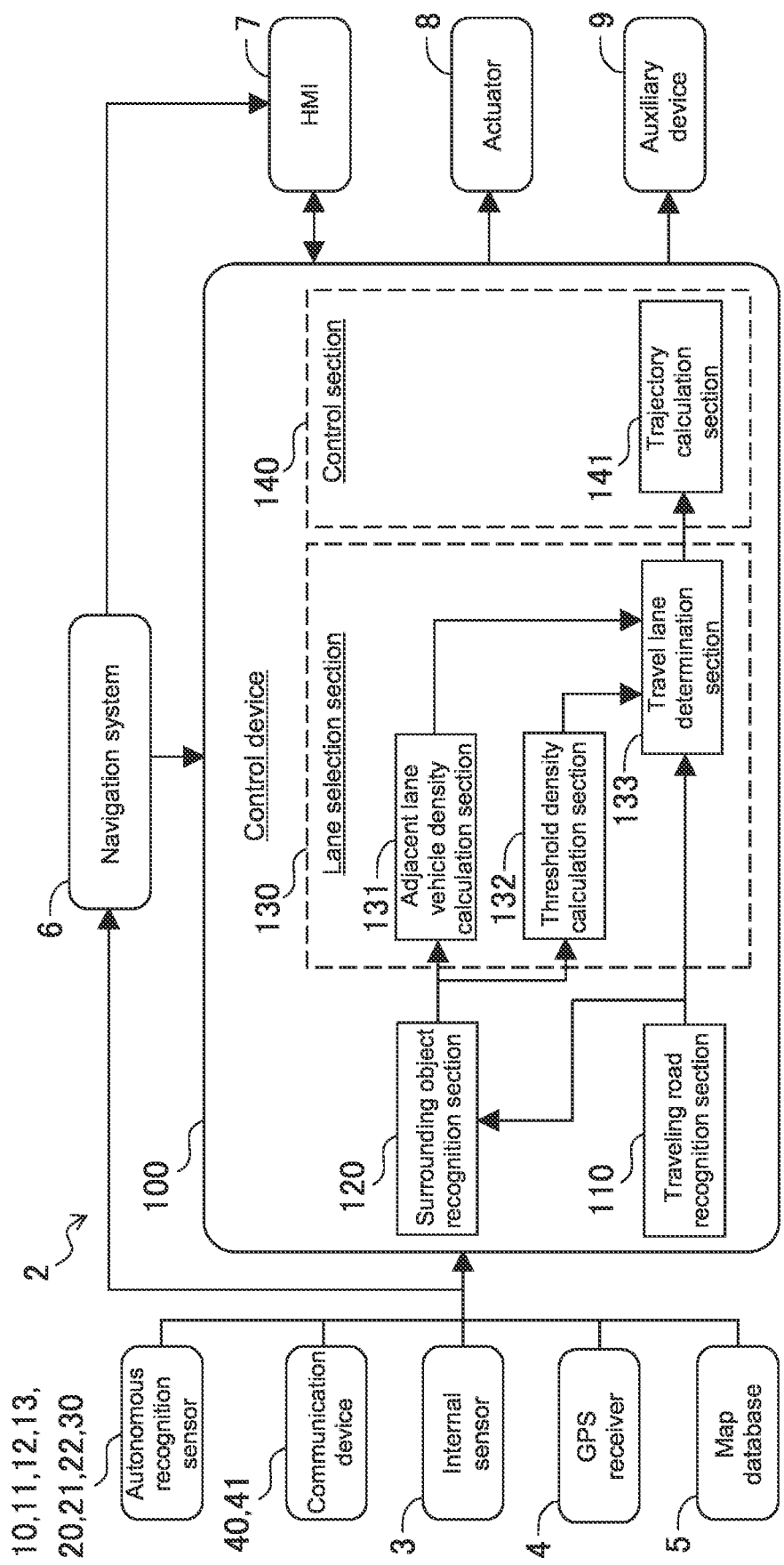
FIG. 2 is a block diagram illustrating a configuration of a control system of the autonomous driving vehicle according to the first embodiment.

Next, a configuration of the autonomous driving system of the present embodiment will be described with use of FIG. 2. As illustrated in FIG. 2, an autonomous driving system 2 includes an internal sensor 3, a GPS (Global Positioning System) receiver 4, a map database 5, a navigation system 6, an HMI (Human Machine Interface) 7, an actuator 8 and an auxiliary device 9, in addition to the control device 100, autonomous recognition sensors 10 to 13, 20 to 22 and 30, and the communication devices 40 and 41 described above.

The internal sensor 3 includes at least one of a vehicle speed sensor, an acceleration sensor and a yaw rate sensor, for example. By these sensors, information concerning a traveling state of the own vehicle is obtained. Further, the internal sensor 3 includes a steering sensor in order to obtain information concerning a steering operation by a driver. The internal sensor 3 outputs the acquired information to the control device 100.

The GPS receiver 4 acquires positional information indicating a position of the own vehicle based on a signal transmitted by a GPS satellite. The GPS receiver 4 outputs the positional information of the own vehicle to the control device 100.

The map database 5 is formed in a storage such as an HDD and an SSD mounted on the vehicle, for example. Map information which the map database 5 has includes, for example, positional information of roads, information on road shapes, positional information of intersections and branch points, lane information of roads and the like. Note that the map database 5 may be stored in a server on the Internet that is communicable by the mobile communication device 41.

The navigation system 6 is a device that performs guidance to a destination that is set on the map by the driver to the driver. The navigation system 6 calculates a route on which the own vehicle travels, based on the positional information of the own vehicle which is measured by the GPS receiver 4 and the map information in the map database 5. The navigation system 6 transmits information on a calculated route to the driver via the HMI 7, and outputs the information on the calculated route to the control device 100. Note that a part of processing that is performed by the navigation system 6 may be performed by a server on the Internet that is communicable by the mobile communication device 41.

The HMI 7 is an interface for outputting and inputting information to and from an occupant and the autonomous driving system 2. The HMI 7 includes, for example, a display for displaying image information to the occupant, a speaker for audio output, a touch panel for the occupant to perform an input operation and the like.

The actuator 8 is a device that operates in response to an operation signal from the control device 100, and changes the traveling state of the vehicle by the operation. The actuator 8 is provided at each of a drive system, a braking system, and a steering system, for example. The auxiliary device 9 is a generic name for devices that are not included in the actuator 8, and includes, for example, a direction indicator lamp, a headlight and the like.

The control device 100 is an ECU (Electronic Control Unit) having at least one CPU, at least one ROM, and at least one RAM. In the ROM, various programs for autonomous driving and various data including maps are stored. The program stored in the ROM is loaded on the RAM and is executed by the CPU, whereby various functions are realized by the control device 100. Note that the control device 100 may be configured by a plurality of ECUs.

1-3. Functions for Autonomous Driving of Control Device

In FIG. 2, functions relating to lane change of the own vehicle is specially expressed by blocks, out of the functions for autonomous driving which the control device 100 has. Illustration of the other functions for autonomous driving which the control device 100 has is omitted.

The control device 100 has a function of selecting a lane on which the own vehicle should travel from a plurality of lanes when the own vehicle travels on a road having a plurality of lanes, and executing autonomous lane change to the selected lane. The function is realized by a traveling road recognition section 110, a surrounding object recognition section 120, a lane selection section 130 and a control section 140 that are included by the control device 100. Note that these sections 110, 120, 130 and 140 do not exist as hardware in the control device 100, but are realized by software when the program stored in the ROM is executed by the CPU.

The traveling road recognition section 110 recognizes a traveling road on which the own vehicle is traveling. A road on which the own vehicle is traveling is a road having a plurality of lanes, the traveling road recognition section 110 also performs recognition of a lane on which the own vehicle is traveling. As methods for recognizing a traveling road by the traveling road recognition section 110, there are at least two methods as follows. A first method is a method that performs traveling road recognition based on map information concerning the road on which the own vehicle is traveling and positional information of the own vehicle. The map information is acquired from the map database 5. The positional information of the own vehicle is acquired from the GPS receiver 4. A second method is a method that extracts traffic lane lines (a white line, a yellow line, a median strip and the like) of a road by processing image pickup information acquired from the camera 30, and performs traveling road recognition based on the traffic lane lines. Either one of the traveling road recognition using the map information and the positional information, and the road recognition using the image pickup information may be used, or both of them may be used in combination. The traveling road recognition section 110 outputs the information concerning the recognized traveling road to the surrounding object recognition section 120 and the lane selection section 130.

The surrounding object recognition section 120 recognizes objects existing around the own vehicle. In recognition of surrounding objects, information acquired from the autonomous recognition sensors 10 to 13, 20 to 22 and 30 is used. The surrounding object recognition section 120 is capable of recognizing surrounding objects by at least one method of using the information of the LIDARs 10 to 13, using the information of the radars 20 to 22, using the information of the camera 30, and using information of a plurality of kinds of autonomous recognition sensors in combination by sensor fusion. The recognized surrounding objects include movable objects such as other vehicles and pedestrians, and stationary objects such as corner stones, guard rails, buildings and trees. Note that the other vehicles mentioned here also include a motor cycle if the motor cycle is traveling on the same lane with automobiles.

The surrounding object recognition section 120 acquires information concerning the traveling road recognized by the traveling road recognition section 110. When the road on which the own vehicle is traveling is a road having a plurality of lanes, the information acquired from the road recognition section 110 also includes the information concerning a traveling lane. The surrounding object recognition section 120 discriminates other vehicles traveling on an own lane (a lane on which the own vehicle is traveling), and other vehicles traveling on an adjacent lane that is adjacent to the own lane, from the recognized surrounding objects, by using the information concerning the traveling road. The surrounding object recognition section 120 outputs positions and speeds of the other vehicles traveling on the own lane, and positions and speeds of the other vehicles traveling on the adjacent lane to the lane selection section 130 as recognition information. Note that the information concerning the positions and speeds of the other vehicles traveling on the adjacent lane corresponds to "information concerning a vehicle density in the adjacent lane". Consequently, a function of the surrounding object recognition section 120 includes a function as an information acquisition section that is specified in the claims of the present application.

The lane selection section 130 selects a lane on which the own vehicle travels, based on the recognition information that is inputted from the road recognition section 110 and the surrounding object recognition section 120 respectively. In detail, the lane selection section 130 selects whether to keep a present own vehicle traveling lane, or to perform lane change to the adjacent lane. In order to realize this function, the lane selection section 130 includes an adjacent lane vehicle density calculation section 131, a threshold density calculation section 132, and a travel lane determination section 133.

The adjacent lane vehicle density calculation section 131 acquires recognition information on surrounding objects that is inputted to the lane selection section 130 from the surrounding object recognition section 120. The recognition information on the surrounding objects includes positions and speeds of the other vehicles traveling on the adjacent lane. The adjacent lane vehicle density calculation section 131 calculates a vehicle density in the adjacent lane based on the positions and the speeds of the other vehicles traveling on the adjacent lane. Here, the vehicle density in the adjacent lane is defined as the number of the other vehicles which are present per unit distance in the adjacent lane. The adjacent lane vehicle density calculation section 131 updates a calculation value of the vehicle density in the adjacent lane at predetermined periods. Details of a calculation method of the vehicle density by the adjacent lane vehicle density calculation section 131 will be described later.

The threshold density calculation section 132 calculates a threshold density to the vehicle density in the adjacent lane which is calculated by the adjacent lane vehicle density calculation section 131. The threshold density is an evaluation reference for evaluating whether the vehicle density in the adjacent lane is high or low. The threshold density calculation section 132 acquires recognition information of surrounding objects that is inputted to the lane selection section 130 from the surrounding object recognition section 120, and calculates the threshold density in accordance with relations between the own vehicle and surrounding vehicles that are determined based on the recognition information of the surrounding objects. The threshold density calculation section 132 updates a calculation value of the threshold density at periods that are set in advance. Details of the calculation method of the threshold density by the threshold density calculation section 132 will be described later.

The travel lane determination section 133 determines a travel lane based on comparison of the vehicle density in the adjacent lane calculated by the adjacent lane vehicle density calculation section 131 and the threshold density calculated by the threshold density calculation section 132. In determination of the travel lane, either one of keeping a present own vehicle travel lane or changing the own vehicle travel lane to the adjacent lane is selected. The travel lane determination section 133 outputs information concerning the determined travel lane to the control section 140. Details of the determination method of the travel lane by the travel lane determination section 133 will be described later.

The control section 140 controls travel of the own vehicle based on information that is inputted from the lane selection section 130. Control by the control section 140 includes two modes as follows, for example. According to a first mode, lane change to the adjacent lane is performed autonomously when performing lane change to the adjacent lane is selected by the lane selection section 130. According to a second mode, proposal of lane change to the adjacent lane to the driver is performed via the HMI 7, when performing lane change to the adjacent lane is selected by the lane selection section 130. When control is performed in the second mode, the control section 140 performs lane change to the adjacent lane autonomously when the driver agrees to the proposal, and when the driver does not agree to the proposal, the control section 140 may keep the present own vehicle travel lane. In order to realize the function like this, the lane selection section 130 includes a trajectory calculation section 141 that calculates a trajectory that should be followed by the own vehicle.

The trajectory calculation section 141 calculates a target trajectory based on information concerning the travel lane which is inputted from the travel lane determination section 133. When keeping the present own vehicle travel lane is selected by the travel lane determination section 133, the trajectory calculation section 141 calculates a target trajectory along the present own vehicle travel lane. When changing the own vehicle travel lane to the adjacent lane is selected by the travel lane determination section 133, the trajectory calculation section 141 calculates a target trajectory in which the own vehicle is moved to the adjacent lane from the present own vehicle travel lane. Concerning each of lane keeping and lane change, the method for trajectory calculation is not limited. The control section 140 calculates an operation amount of the actuator 8 of at least one of the drive system, the braking system and the steering system based on the target trajectory calculated in the trajectory calculation section 141. The control section 140 operates the actuator 8 in accordance with the calculated operation amount, and thereby controls travel of the own vehicle.

1-4. Details of Calculation Method of Vehicle Density

Figure 3:
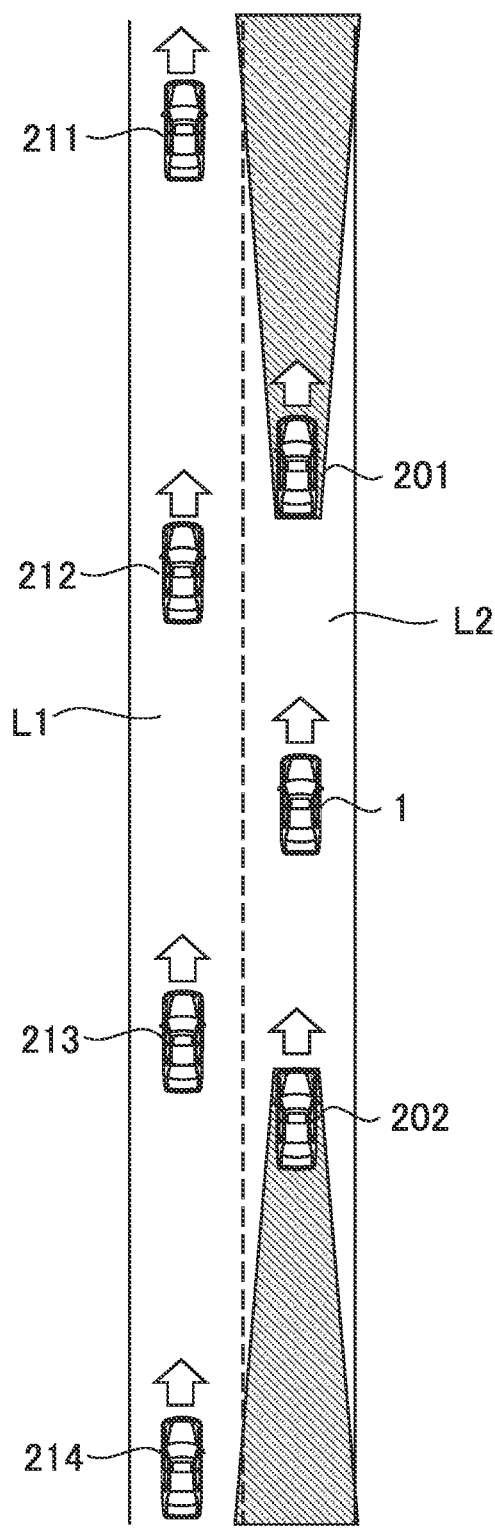
FIG. 3 is a view for explaining surrounding object recognition by the control system of the autonomous driving vehicle according to the first embodiment.

Details of the calculation method of the vehicle density by the adjacent lane vehicle density calculation section 131 will be described with use of FIG. 3. FIG. 3 illustrates a state in which the own vehicle 1 travels on a second lane L2 in a road having a first lane L1 and the second lane L2. During traveling of the own vehicle 1, other vehicles which are present around the own vehicle 1 are recognized by the autonomous recognition sensors 10 to 13, 20 to 22 and 30 (refer to FIG. 1) included by the own vehicle 1.

In an example illustrated in FIG. 3, a preceding vehicle 201 and a following vehicle 202 that travel on an own lane (the second lane) L2 are recognized. Other vehicles may be present respectively ahead of the preceding vehicle 201 and behind the following vehicle 202, but these vehicles are in blind spots (regions illustrated by oblique lines in FIG. 3) of the autonomous recognition sensors, and therefore it is difficult for the autonomous recognition sensors to recognize these vehicles. On the adjacent lane (the first lane) L1, vehicles which are present in a range of approximately 100 to 200 m in front and rear of the own vehicle 1 are recognized, although it depends on ranges of the blind spots of the autonomous recognition sensors. In the example illustrated in FIG. 3, four vehicles 211, 212, 213 and 214 that travel on the adjacent lane L1 are recognized.

The adjacent lane vehicle density calculation section 131 calculates the vehicle density in the adjacent lane L1 from positional information of continuous three vehicles or more that travel on the adjacent lane L1. Specifically, when N (>3) vehicles are located on the adjacent lane L1, the spaces among the vehicles that travel one behind another are acquired respectively, and thereby N−1 (>2) of inter-vehicle distances can be defined. The adjacent lane vehicle density calculation section 131 calculates a representative value of N−1 of inter-vehicle distances, takes an inverse value of the representative value, and thereby calculates the number of vehicles present per unit distance of the adjacent lane L1, that is, the vehicle density in the adjacent lane L1. In the example illustrated in FIG. 3, the representative value of the inter-vehicle distances is calculated based on an inter-vehicle distance between the vehicle 211 and the vehicle 212, an inter-vehicle distance between the vehicle 212 and the vehicle 213, and an inter-vehicle distance between the vehicle 213 and the vehicle 214. As the calculation method of the representative value of the inter-vehicle distances, for example, taking a statistic average value of the respective inter-vehicle distances, taking a medium value and the like are cited. Further, taking the average value after assigning weights to the respective inter-vehicle distances, and taking the average value after excluding inter-vehicle distances of a threshold value or more may be adopted. Further, the representative value may be defined by a function with the respective inter-vehicle distances as arguments. Note that when the number of vehicles traveling in the range which is recognizable by the autonomous recognition sensors is two or less, the adjacent lane vehicle density calculation section 131 outputs a minimum value that is set in advance as the vehicle density of the adjacent lane L1.

1-5. Details of Calculation Method of Threshold Density

In the present embodiment, the threshold density calculation section 132 acquires a relative speed to the own vehicle, of other vehicles traveling in the adjacent lane that is included in the recognition information of surrounding objects. In the example illustrated in FIG. 3, in a case where a traveling speed of the own vehicle 1 is lower than traveling speeds of other vehicles traveling on the adjacent lane, a relative speed may be calculated from a difference between an average speed of the plurality of vehicles 211 and 212 that pass the own vehicle 1 and the traveling speed of the own vehicle 1. Further, when the traveling speed of the own vehicle 1 is higher than the traveling speeds of other vehicles traveling on the adjacent lane, a relative speed may be calculated from a difference between an average speed of the plurality of vehicles 213 and 214 which the own vehicle 1 passes and the traveling speed of the own vehicle 1.

Figure 4:
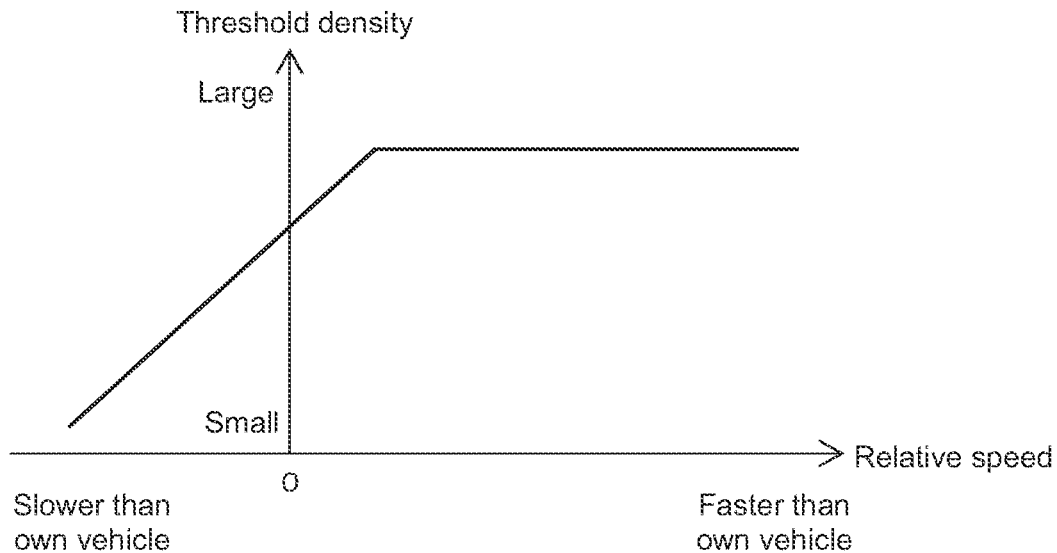
FIG. 4 is a diagram for explaining a calculation method of a threshold density according to the first embodiment.

The threshold density calculation section 132 calculates a threshold density from the relative speed, by using a map in which a relation illustrated in FIG. 4 is specified. According to the map, as the traveling speed of the other vehicles traveling in the adjacent lane is lower than the traveling speed of the own vehicle, the threshold density is set at a smaller value. Further, as the relative speed becomes higher, the threshold density is set at a larger value, and at a relative speed equal to or higher than a fixed speed, the threshold density is set at substantially the same density. The threshold density is an evaluation reference for evaluating whether the vehicle density in the adjacent lane is high or low. Therefore, according to setting of the threshold density shown in the map, when a flow speed in the adjacent lane is lower than a flow speed in the own lane, the vehicle density in the adjacent lane tends to be evaluated as relatively high. On the other hand, when the flow speed in the adjacent lane is higher than the flow speed in the own lane, the vehicle density in the adjacent lane tends to be evaluated as relatively low.

1-6. Details of Determination Method of Travel Lane

The travel lane determination section 133 compares the vehicle density in the adjacent lane which is calculated in the adjacent lane vehicle density calculation section 131, and the threshold density which is calculated in the threshold density calculation section 132. When the vehicle density in the adjacent lane is higher than the threshold density, the merit of changing the own vehicle travel lane to the adjacent lane is small. However, if the vehicle density in the adjacent lane is lower than the threshold density, a traffic flow can be dispersed between at least two adjacent lanes by changing the own vehicle travel lane to the adjacent lane. Consequently, the travel lane determination section 133 selects to change the own vehicle travel lane to the adjacent lane when the vehicle density in the adjacent lane is lower than the threshold density, and selects to keep the present own vehicle travel lane when the vehicle density in the adjacent lane is the threshold density or more.

Figure 5:
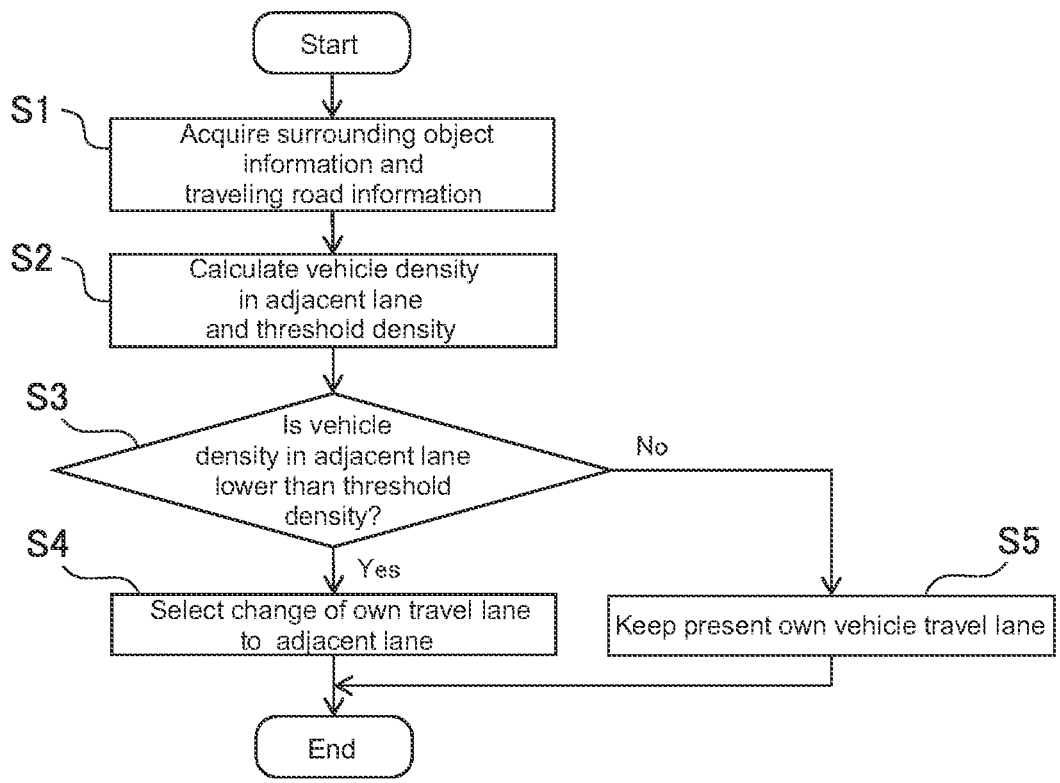
FIG. 5 is a flowchart illustrating a flow of lane selection according to the first embodiment.

Here, FIG. 5 is a flowchart illustrating a flow of the lane selection by the lane selection section 130. The lane selection section 130 repeatedly carries out the processing illustrated in the flowchart at predetermined frequency until lane change is performed. First, in step S1, the lane selection section 130 acquires the surrounding object information and the traveling road information from the surrounding object recognition section 120 and the traveling road recognition section 110. In step S2, the lane selection section 130 calculates the vehicle density in the adjacent lane and the threshold density based on the surrounding object information and the traveling road information which are acquired in step S1 respectively. Subsequently, in step S3, the lane selection section 130 compares the vehicle density and the threshold density which are calculated in step S2, and determines whether the vehicle density in the adjacent lane is lower than the threshold density. When the vehicle density in the adjacent lane is lower than the threshold density, the lane selection section 130 selects change of the own travel lane to the adjacent lane in step S4. When the vehicle density in the adjacent lane is the threshold density or more, the lane selection section 130 selects to keep the present own vehicle travel lane in step S5.

1-7. Specific Example of Lane Change

Figure 6:
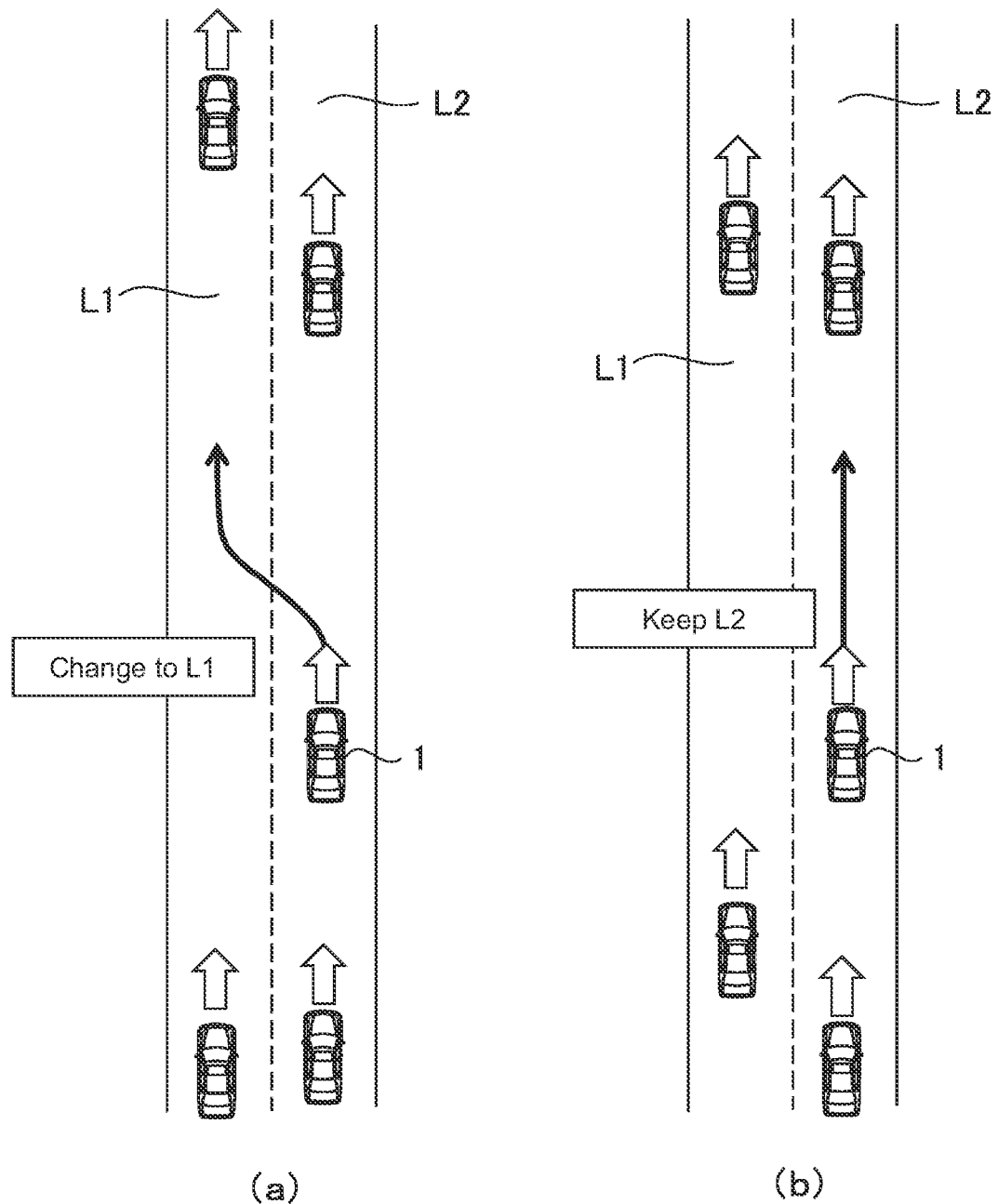
FIG. 6 is a diagram illustrating a specific example of lane change according to the first embodiment.

By the lane selection carried out as described above, travel of the own vehicle 1 is controlled as shown in FIG. 6 for example. In an example illustrated in FIG. 6 (a), the vehicle density in the adjacent lane L1 is smaller than the threshold density. Therefore, the control section 140 (refer to FIG. 2) controls travel of the own vehicle 1 to perform lane change to the adjacent lane L1 autonomously, or proposes lane change to the adjacent lane L1 to the driver. In an example illustrated in FIG. 6 (b), the vehicle density in the adjacent lane L1 is larger than the threshold density. Therefore, the control section 140 controls travel of the own vehicle 1 to keep the own lane L2.

By travel of the own vehicle 1 controlled as above, an imbalance in the traffic flow is eliminated by the lane change of the own vehicle 1 at least between the lane L2 on which the own vehicle is traveling and the adjacent lane L1. Further, because the threshold density for determining whether or not to perform lane change to the adjacent lane is determined in accordance with the relative speed that represents the flow state of the adjacent lane, lane change to suit a sense of the occupant can be realized.

Second Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the calculation method of the threshold density by the threshold density calculation section 132.

In the present embodiment, the threshold density calculation section 132 acquires a forward inter-vehicle distance between the own vehicle and the preceding vehicle that is included in the recognition information of surrounding objects. In an example illustrated in FIG. 3, a forward inter-vehicle distance between the own vehicle 1 and the preceding vehicle 201 traveling in the own lane L2 is acquired.

The threshold density calculation section 132 calculates a threshold density from the forward inter-vehicle distance, by using a map in which a relation illustrated in FIG. 7 is specified. According to the map, as the forward inter-vehicle distance is long, the threshold density is set at a smaller value. Further, as the forward inter-vehicle distance is short, the threshold density is set at a larger value, and at a forward inter-vehicle distance equal to or shorter than a fixed distance, the threshold density is set at substantially the same density. The forward inter-vehicle distance represents the congestion state in the own lane, and the threshold density is an evaluation reference for evaluating whether the vehicle density in the adjacent lane is high or low. Therefore, according to setting of the threshold density shown in the map, when the own lane is not crowded, the vehicle density in the adjacent lane tends to be evaluated as relatively high. On the other hand, when the own lane is crowded, the vehicle density in the adjacent lane tends to be evaluated as relatively low.

According to the autonomous driving system according to the present embodiment, whether to perform lane change to the adjacent lane is determined with a congestion state in the own lane also taken into consideration, in addition to the vehicle density in the adjacent lane. Consequently, an effect of lane change of the own vehicle dispersing a traffic flow can be enhanced, and lane change to suit to a sense of the occupant can be realized.

Note that in the present embodiment, the threshold density is determined in accordance with the forward inter-vehicle distance, but the threshold density may be determined in accordance with a rearward inter-vehicle distance between the own vehicle and the following vehicle, or the threshold density may be determined in accordance with an average value or a total value of the forward inter-vehicle distance and the rearward inter-vehicle distance. Further, the calculation method of the threshold density according to the present embodiment may be combined with the calculation method of the threshold density according to the first embodiment. That is, threshold density may be determined in accordance with the forward inter-vehicle distance and the relative speed to the own vehicle of other vehicles traveling in the adjacent lane.

Third Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the calculation method of the threshold density by the threshold density calculation section 132.

In the present embodiment, the threshold density calculation section 132 calculates the vehicle density in the own lane as the threshold density. As illustrated in FIG. 3, vehicles recognizable in the own vehicle travel lane L2 are only the preceding vehicle 201 and the following vehicle 202 in closest vicinities, and it is difficult to recognize the other vehicles because the other vehicles are in blind spots of the autonomous recognition sensors 10 to 13, 20 to 22 and 30 (refer to FIG. 1). Therefore, in the present embodiment, the vehicle density in the own lane is not obtained by a statistical method, but the vehicle density in the own lane is estimated from information correlated with the vehicle density.

The information correlated with the vehicle density refers to a relation between a standard traveling speed on the road where the vehicles are traveling, and an actual traveling speed of the vehicles. Specifically, when a situation where vehicles are traveling at the standard traveling speed, and a situation where the vehicles are traveling at a lower speed than the standard traveling speed are compared, a vehicle density in the latter situation tends to be higher than a vehicle density in the former situation. Further, when a road in which the standard traveling speed is high, and a road in which the standard traveling speed is low are compared, a vehicle density in the latter road tends to be higher than a vehicle density in the former road. Consequently, if the traveling speed of the vehicles traveling on the own lane and the standard traveling speed in the own lane are known, the vehicle density in the own lane can be estimated based on the traveling speed of the vehicle traveling on the own lane and the standard traveling speed in the own lane.

The threshold density calculation section 132 acquires a traveling speed of the preceding vehicle 201 which is contained in the recognition information of the surrounding objects, and acquires a regulation speed of the own lane L2 as the standard traveling speed from the map database 5

(refer to FIG. 2). The traveling speed of the preceding vehicle 201 is used as a representative value of traveling speeds of the vehicles traveling on the own lane. The threshold density calculation section 132 searches for a table illustrated in FIG. 8 with the traveling speed of the preceding vehicle 201 and the standard traveling speed as arguments respectively. According to the table, a representative value of the standard vehicle density is obtained from the standard traveling speed. Further, according to the table, from the standard traveling speed and the traveling speed of the preceding vehicle, a coefficient by which the representative value of the standard vehicle density is multiplied is obtained. Subsequently, a value obtained by multiplying the representative value of the standard vehicle density by the coefficient is calculated as the vehicle density in the own lane. Note that as the representative value of the standard vehicle density, a fixed value that is obtained by performing an actual survey with respect to the relation between the traveling speed and the vehicle density may be used, for example. Alternatively, a time-series average value of the vehicle density in the adjacent lane L1 may be used as the representative value of the standard vehicle density in the own lane L2.

FIG. 9 is a graph expressing relationship among parameters specified in the table illustrated in FIG. 8. As illustrated in the graph, as a difference between the standard traveling speed of the own lane and the traveling speed of the preceding vehicle of the own lane is larger, the vehicle density of the own lane, which is calculated by the threshold density calculation section 132 becomes larger. Further, as the standard traveling speed of the own lane is lower, the vehicle density in the own lane, which is calculated by the threshold density calculation section 132 becomes larger. Note that in the present embodiment, the vehicle density in the own lane is calculated by using the table illustrated in FIG. 4, but the relationship among the parameters shown in the graph illustrated in FIG. 9 is specified by a function, and the vehicle density in the own lane, that is, the threshold density may be calculated by using the function.

According to the autonomous driving system according to the present embodiment, whether to make lane change to the adjacent lane is determined with the congestion state in the own lane also taken into consideration, in addition to the vehicle density in the adjacent lane. Consequently, an effect of lane change of the own vehicle dispersing a traffic flow can be enhanced, and lane change suitable for an occupant's sense can be realized.

The calculation method of the threshold density according to the present embodiment may be combined with the calculation method of the threshold density according to the first embodiment. That is, threshold density may be determined in accordance with the vehicle density in the own lane and the relative speed to the own vehicle of other vehicles traveling in the adjacent lane.

Fourth Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the calculation method of the vehicle density in the adjacent lane by the adjacent lane vehicle density calculation section 131.

In the present embodiment, as the recognition information on the surrounding objects, the surrounding object recognition section 120 acquires each time interval with which continuous three or more vehicles that travel on the adjacent lane L1 go through a side of the own vehicle, and relative speeds to the own vehicle of vehicles traveling in the adjacent lane L1. In an example illustrated in FIG. 3, in a case where a traveling speed of the own vehicle 1 is lower than traveling speeds of other vehicles traveling on the adjacent lane L1, each time interval with which vehicles 211, 212, 213 and 214 pass the own vehicle 1 one by one, and each of relative speeds to the own vehicle 1 of vehicles 211, 212, 213 and 214 are acquired. On the other hand, in a case where the traveling speed of the own vehicle 1 is higher than the traveling speeds of other vehicles traveling on the adjacent lane L1, each time interval with which the own vehicle 1 passes vehicles 214, 213, 212 and 211 one by one, and each of relative speeds to the own vehicle 1 of vehicles 214, 213, 212 and 211 are acquired.

The adjacent lane vehicle density calculation section 131 calculates the vehicle density in the adjacent lane L1 from the above recognition information. Specifically, when N (>3) vehicles traveling in the adjacent lane L1 go through the side of the own vehicle 1, N−1 (>2) time intervals are acquired. The adjacent lane vehicle density calculation section 131 calculates a representative value of N−1 of time intervals, multiplies it by a representative value of the relative speeds, and thereby calculates a representative value of the inter-vehicle distances. As the calculation method of the representative value of the time intervals, for example, taking a statistic average value of the time intervals, taking a medium value and the like are cited. The representative value of the relative speeds may be an average value of the relative speeds to the own vehicle of N of the vehicles. The adjacent lane vehicle density calculation section 131 takes an inverse value of the representative value of the inter-vehicle distances, and thereby calculates the number of vehicles present per unit distance of the adjacent lane L1, that is, the vehicle density in the adjacent lane L1.

According to the above calculation method, if only vehicles going through a side of the own vehicle are recognized, it is possible to calculate the vehicle density in the adjacent lane. Consequently, according to the autonomous driving system according to the present embodiment, the blind spots of the autonomous recognition sensors can be restrained from affecting the control. Note that, the calculation method of the vehicle density in the adjacent lane according to the present embodiment may be combined with the calculation method of the vehicle density in the adjacent lane according to the first embodiment.

Fifth Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the method for recognizing surrounding objects by the surrounding object recognition section 120.

In the present embodiment, the surrounding object recognition section 120 acquires the road traffic information received by the road-vehicle communication device 40. In the infrastructure equipment such as a road traffic information system with which the road-vehicle communication device 40 communicates, positional information of vehicles traveling on the road is collected and is transmitted as road traffic information. Therefore, the road traffic information which is acquired by the surrounding object recognition section 120 includes at least rough positional information of other vehicles on the road where the own vehicle is traveling. That is, in the present embodiment, recognition of the surrounding objects is performed on the side of the infrastructure equipment, and the surrounding object recognition section 120 receives the recognition information and outputs the recognition information to the lane selection section 130.

Specifically, the surrounding object recognition section 120 classifies the positional information of other vehicles which is the recognition information into positional information of other vehicles traveling on the own lane, and positional information of other vehicles traveling on the adjacent lane. The surrounding object recognition section 120 outputs the positional information of the other vehicles traveling on the adjacent lane to the adjacent lane vehicle density calculation section 131, and outputs the positional information of the other vehicles traveling on the own lane to the threshold density calculation section 132.

The adjacent lane vehicle density calculation section 131 calculates the vehicle density in the adjacent lane based on the positional information of the other vehicles traveling on the adjacent lane. The threshold density calculation section 132 calculates the vehicle density in the own lane as the threshold density based on the positional information of the other vehicles traveling on the own lane. The method for calculating the vehicle density from the positional information of three vehicles or more is as described in the first embodiment.

According to the autonomous driving system according to the present embodiment, the information concerning the vehicle density in the adjacent lane, and the information concerning the vehicle density in the own lane can be acquired without using the autonomous recognition sensors. Therefore, according to the autonomous driving system according to the present embodiment, even under the situation where the autonomous recognition sensors do no function effectively, traveling of the own vehicle can be controlled so as to eliminate an imbalance in the traffic flow in each of the lanes. Note that the method for recognizing surrounding objects according to the present embodiment may be used in combination with the method for recognizing surrounding objects using the autonomous recognition sensors.

Sixth Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the method for recognizing surrounding objects by the surrounding object recognition section 120, the method for calculating the vehicle density in the adjacent lane by the adjacent lane vehicle density calculation section 131, and the method for calculating the threshold density by the threshold density calculation section 132.

In the present embodiment, recognition information obtained by the autonomous recognition sensors in the respective vehicles, and recognition information obtained by recognition devices installed on roads are collected by a server on the Internet. The server processes the collected information, and calculates a vehicle density in each lane in each road. Under the precondition like this, the mobile communication device 41 transmits information concerning the road on which the own vehicle is traveling to the server, and receives the vehicle density in each of the lanes of the road on which the own vehicle is traveling. The surrounding object recognition section 120 classifies the vehicle density in each of the lanes which is received by the mobile communication device 41 into the vehicle density in the adjacent lane and the vehicle density in the own lane. The surrounding object recognition section 120 outputs the vehicle density in the adjacent lane to the adjacent lane vehicle density calculation section 131, and outputs the vehicle density in the own lane to the threshold density calculation section 132.

The adjacent lane vehicle density calculation section 131 directly outputs the vehicle density in the adjacent lane that is inputted from the surrounding object recognition section 120 to the travel lane determination section 133. The threshold density calculation section 132 directly outputs the vehicle density in the own lane that is inputted from the surrounding object recognition section 120 to the travel lane determination section 133 as the threshold density. That is, in the present embodiment, calculation of the vehicle density in each of the lanes is performed in the server in advance, and therefore the surrounding object recognition section 120, the adjacent lane vehicle density calculation section 131 and the threshold density calculation section 132 can transmit calculation results by the server that are received by the mobile communication device 41 directly to a downstream side.

According to the autonomous driving system according to the present embodiment, the vehicle density in the adjacent lane, and the vehicle density in the own lane can be respectively acquired without using the autonomous recognition sensors. Therefore, according to the autonomous driving system according to the present embodiment, even under the situation where the autonomous recognition sensors do not function effectively, traveling of the own vehicle can be controlled so as to eliminate an imbalance in the traffic flow in each of the lanes. Note that the method for recognizing surrounding objects according to the present embodiment may be used in combination with the method for recognizing surrounding objects using the autonomous recognition sensors.

Seventh Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the method for selecting the travel lane by the lane selection section 130.

In the first embodiment, a road on which the own vehicle travels is assumed to have two lanes, but in the present embodiment, a road on which the own vehicle travels is assumed to have two or more lanes. According to this assumption, there is a case where a lane to which lane change from the own lane is possible exists adjacent to both side of the own lane. In this case, either of lane change to a right adjacent lane and lane change to a left adjacent lane should be selected.

Figure 10:
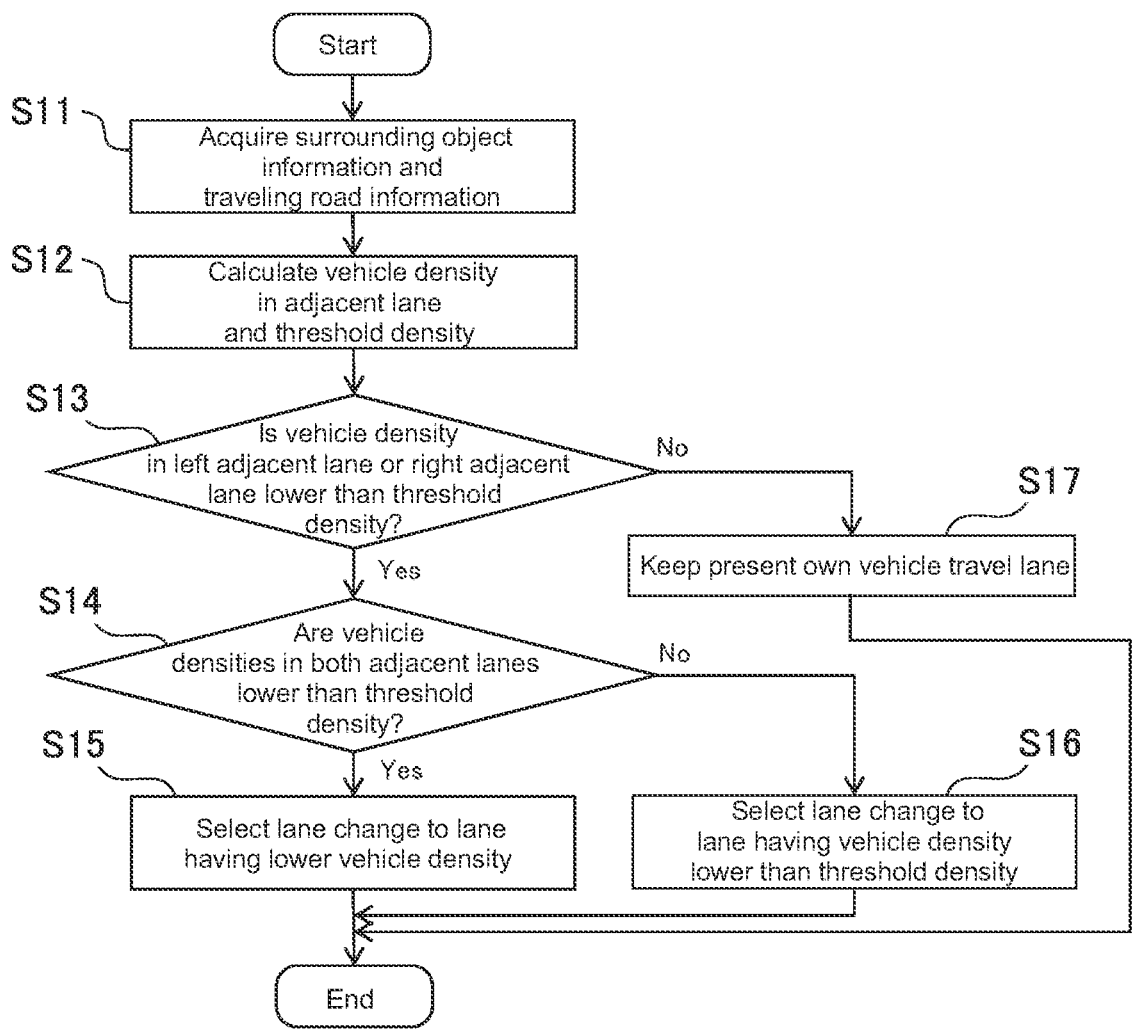
FIG. 10 is a flowchart illustrating a flow of lane selection according to a seventh embodiment.

FIG. 10 is a flowchart illustrating a flow of the lane selection according to the present embodiment. The lane selection section 130 repeatedly carries out the processing illustrated in the flowchart at predetermined frequency until lane change is performed. First, in step S11, the lane selection section 130 acquires the surrounding object information and the traveling road information from the surrounding object recognition section 120 and the traveling road recognition section 110. In step S12, the lane selection section 130 calculates the vehicle density in the adjacent lane and the threshold density based on the surrounding object information and the traveling road information which are acquired in step S11 respectively. When the own lane is a left side lane or a right side lane, only one lane is adjacent to the own lane, but when the own lane is not a left side lane nor a right side lane, two lanes are adjacent to the own lane. When there are adjacent lanes at both side of the own lane, in step S12, the lane selection section 130 calculates the vehicle densities in both the adjacent lanes respectively.

In step S3, the lane selection section 130 compares the vehicle density and the threshold density which are calculated in step S12, and determines whether the vehicle density in the adjacent lane is lower than the threshold density. When the vehicle densities in both the adjacent lanes are calculated in step S12, the lane selection section 130 compares with the threshold density the vehicle density in the left adjacent lane and the vehicle density in the right adjacent lane. When both the vehicle density in the left adjacent lane and the vehicle density in the right adjacent lane are the threshold density or more, the lane selection section 130 selects to keep the present own vehicle travel lane in step S17.

When either vehicle density of the left adjacent lane and the right adjacent lane is lower than the threshold density, the lane selection section 130 subsequently performs determination in step S14. In step S14, the lane selection section 130 determines whether or not the vehicle densities in both the adjacent lanes are lower than the threshold frequency. When the determination result is negative, in step S16, the lane selection section 130 selects change of the own travel lane to a lane in which the vehicle density is lower than the threshold density. When the determination result is positive, in step S15, the lane selection section 130 selects change of the own travel lane to a lane having a lower vehicle density, of both adjacent lanes.

By the lane selection carried out as described above, travel of the own vehicle 1 is controlled as shown in FIG. 11 for example. In an example illustrated in FIG. 11 (a) (b), both the vehicle density in the left adjacent lane L1 and the vehicle density in the right adjacent lane L3 are smaller than the threshold density. However, in the example illustrated in FIG. 11 (a), the vehicle density in the left adjacent lane L1 is lower than the vehicle density in the right adjacent lane L3. Therefore, the control section 140 (refer to FIG. 2) controls travel of the own vehicle 1 to perform lane change to the left adjacent lane L1 autonomously, or proposes lane change to the left adjacent lane L1 to the driver. On the other hand, in the example illustrated in FIG. 11 (b), the vehicle density in the right adjacent lane L3 is lower than the vehicle density in the left adjacent lane L1. Therefore, the control section 140 controls travel of the own vehicle 1 to perform lane change to the right adjacent lane L3 autonomously, or proposes lane change to the right adjacent lane L3 to the driver. By travel of the own vehicle 1 controlled as above, an imbalance in the traffic flow is eliminated by the lane change of the own vehicle 1 at least between the own lane L2 on which the own vehicle is traveling and both the adjacent lanes L1, L3.

Note that, when the vehicle densities in both lanes adjacent to the own lane are lower than the threshold density, the following selection may be performed instead of the selection of step S15.

A first selection instead of the selection of step S15 is to select as the own vehicle travel lane a lane satisfying a constraint determined by regulation information or traveling road information, of both the adjacent lanes. For example, if keeping left lane is required by a regulation, lane change to a left adjacent lane is selected preferentially. If there exists a passing lane, lane change to a lane opposite to the passing lane is selected preferentially.

A second selection instead of the selection of step S15 is to select as the own vehicle travel lane a lane that can make a traveling state of the own vehicle approach more closely a target traveling state, of both the adjacent lanes. For example, when a current speed of the own vehicle is lower than a set speed of an auto-cruise device by a predetermined speed or more, if keeping left lane is required by a regulation, lane change to a right adjacent lane is selected preferentially. If there exists a passing lane, lane change to the passing lane is selected preferentially.

Other Embodiments

The vehicle density in the own lane may be calculated as follows when the threshold density is calculated based on the vehicle density in the own lane. First, when the own vehicle is traveling on a certain lane, the vehicle density in the adjacent lane is calculated by the method described in the first embodiment, for example. The vehicle density in the adjacent lane is stored in the memory, and is updated at predetermined periods. When change to the adjacent lane is performed, the vehicle density in the adjacent lane which is stored in the memory at the point of time is read, and is stored in another region in the memory as the vehicle density in the own lane. The vehicle density in the own lane which is stored is held until lane change is performed again.

What is claimed is:

1. A method comprising:
   extracting traffic lane lines of a traveling road on which an own vehicle is traveling by processing image pickup information acquired from a camera mounted on the own vehicle, the traveling road having a plurality of lanes;
   recognizing the traveling road on which the own vehicle is traveling based on the traffic lane lines;
   recognizing speeds of other vehicles traveling on an own lane on which the own vehicle is traveling, speeds of other vehicles traveling on an adjacent lane that is adjacent to the own lane, and speeds of other vehicles traveling on a second adjacent lane on an opposite side to the adjacent lane with the own lane therebetween;
   determining a vehicle density in the adjacent lane based on the speeds of other vehicles traveling on the adjacent lane;
   determining a vehicle density in the second adjacent lane based on the speeds of other vehicles traveling on the second adjacent lane;
   calculating a vehicle density in the own lane based on a relation between a standard traveling speed on the traveling road and an actual traveling speed of the vehicles traveling on the own lane;

determining whether to perform a lane change to the adjacent lane or the second adjacent lane based on the vehicle density in the adjacent lane, the vehicle density in the second adjacent lane, and the vehicle density in the own lane; and
upon determining to perform the lane change to the adjacent lane or the second adjacent lane, causing the own vehicle to perform the lane change.

2. The method of claim 1, further comprising recognizing the traveling road on which the own vehicle is traveling based on map information concerning the traveling road on which the own vehicle is traveling and positional information of the own vehicle.

3. The method of claim 1, further comprising:
determining to perform a lane change to the adjacent lane when the vehicle density in the adjacent lane is less than the vehicle density in the own lane and less than the vehicle density in the second adjacent lane, and
determining to perform a lane change to the second adjacent lane when the vehicle density in the second adjacent lane is less than the vehicle density in the own law and less than the vehicle density in the adjacent lane.

4. The method of claim 1, further comprising, after determining to perform a lane change to the adjacent lane:
proposing a lane change to a driver of the own vehicle; and
performing a lane change to the adjacent lane when the driver of the own vehicle agrees to the lane change.

5. The method of claim 1, further comprising, after determining to perform a lane change to the adjacent lane, calculating a target trajectory to move the own vehicle from the own lane to the adjacent lane.

6. The method of claim 1, further comprising determining the vehicle density in the adjacent lane based on positional information of three or more continuous vehicles that travel on the adjacent lane.

7. The method of claim 6, further comprising determining the vehicle density in the adjacent lane based on a statistic average value of respective inter-vehicle distances between the three or more continuous vehicles that travel on the adjacent lane.

8. The method of claim 6, further comprising determining the vehicle density in the adjacent lane by assigning weights to respective inter-vehicle distances between the three or more continuous vehicles that travel on the adjacent lane and taking an average value of the weighted inter-vehicle distances after excluding inter-vehicle distances of a threshold value or more.

9. An autonomous driving system for an own vehicle comprising an electronic control unit configured to:
extract traffic lane lines of a traveling road on which the own vehicle is traveling by processing image pickup information acquired from a camera mounted on the own vehicle, the traveling road having a plurality of lanes;
recognize the traveling road on which the own vehicle is traveling based on the traffic lane lines;
recognize speeds of other vehicles traveling on an own lane on which the own vehicle is traveling, speeds of other vehicles traveling on an adjacent lane that is adjacent to the own lane, and speeds of other vehicles traveling on a second adjacent lane on an opposite side to the adjacent lane with the own therebetween;
determine a vehicle density in the adjacent lane based on the speeds of other vehicles traveling on the adjacent lane;
determine a vehicle density in the second adjacent lane based on the speeds of other vehicles traveling on the second adjacent lane;
calculate a vehicle density in the own lane based on a relation between a standard traveling speed on the traveling road and an actual traveling speed of vehicles traveling on the own lane;
determine whether to perform a lane change to the adjacent lane or the second adjacent lane based on the vehicle density in the adjacent lane, the vehicle density in the second adjacent lane, and the vehicle density in the own lane; and
upon determining to perform the lane change to the adjacent lane or the second adjacent lane, cause the own vehicle to perform the lane change.

10. The autonomous driving system of claim 9, wherein the electronic control unit is further configured to recognize the traveling road on which the own vehicle is traveling based on map information concerning the traveling road on which the own vehicle is traveling and positional information of the own vehicle.

11. The autonomous driving system of claim 9, wherein the electronic control unit is further configured to, after determining to perform a lane change to the adjacent lane:
propose a lane change to a driver of the own vehicle; and
perform a lane change to the adjacent lane when the driver of the own vehicle agrees to the lane change.

12. The autonomous driving system of claim 9, wherein the electronic control unit is further configured to determine the vehicle density in the adjacent lane based on positional information of three or more continuous vehicles that travel on the adjacent lane.

13. The autonomous driving system of claim 12, wherein the electronic control unit is further configured to determine the vehicle density in the adjacent lane based on a statistic average value of respective inter-vehicle distances between the three or more continuous vehicles that travel on the adjacent lane.

14. A computer readable non-transitory storage medium, having instructions that, when executed by a processor, cause the processor to:
extract traffic lane lines of a traveling road on which an own vehicle is traveling by processing image pickup information acquired from a camera mounted on the own vehicle, the traveling road having a plurality of lanes;
recognize the traveling road on which the own vehicle is traveling based on the traffic lane lines;
recognize speeds of other vehicles traveling on an own lane on which the own vehicle is traveling, speeds of other vehicles traveling on an adjacent lane that is adjacent to the own lane, and speeds of other vehicles traveling on a second adjacent lane on an opposite side to the adjacent lane with the own therebetween;
determine a vehicle density in the adjacent lane based on the speeds of other vehicles traveling on the adjacent lane;
determine a vehicle density in the second adjacent lane based on the speeds of other vehicles traveling on the second adjacent lane;
calculate a vehicle density in the own lane based on a relation between a standard traveling speed on the traveling road and an actual traveling speed of vehicles traveling on the own lane;
determine whether to perform a lane change to the adjacent lane or the second adjacent lane based on the vehicle density in the adjacent lane, the vehicle density in the second adjacent lane, and the vehicle density in the own lane; and upon determining to perform the lane change to the adjacent lane or the second adjacent lane, cause the own vehicle to perform the lane change.

15. The non-transitory storage medium of claim 14, wherein the instructions further cause the processor to recognize the traveling road on which the own vehicle is traveling based on map information concerning the traveling road on which the own vehicle is traveling and positional information of the own vehicle.

16. The non-transitory storage medium of claim 14, wherein the instructions further cause the processor to, after determining to perform a lane change to the adjacent lane:
propose a lane change to a driver of the own vehicle; and
perform a lane change to the adjacent lane when the driver of the own vehicle agrees to the lane change.

17. The non-transitory storage medium of claim 14, wherein the instructions further cause the processor to determine the vehicle density in the adjacent lane based on positional information of three or more continuous vehicles that travel on the adjacent lane.

* * * * *